US010180223B2

(12) United States Patent
Grammer (10) Patent No.: US 10,180,223 B2
(45) Date of Patent: Jan. 15, 2019

(54) MODULAR LAMP COMPONENTS AND METHODS FOR MAKING SAME

(71) Applicant: SABIC GLOBAL TECHNOLOGIES B.V., Bergen Op Zoom (NL)

(72) Inventor: Bernd Grammer, Bad Aibling (DE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 14 days.

(21) Appl. No.: 15/126,737

(22) PCT Filed: Mar. 16, 2015

(86) PCT No.: PCT/IB2015/051917
§ 371 (c)(1),
(2) Date: Sep. 16, 2016

(87) PCT Pub. No.: WO2015/140697
PCT Pub. Date: Sep. 24, 2015

(65) Prior Publication Data
US 2017/0122517 A1    May 4, 2017

Related U.S. Application Data

(60) Provisional application No. 61/955,271, filed on Mar. 19, 2014.

(51) Int. Cl.
*F21V 1/00* (2006.01)
*F21S 41/29* (2018.01)
(Continued)

(52) U.S. Cl.
CPC ............... *F21S 41/29* (2018.01); *B60Q 1/18* (2013.01); *B60Q 1/20* (2013.01); *B60Q 1/28* (2013.01);
(Continued)

(58) Field of Classification Search
CPC ............... F21S 48/1208; F21S 48/2206; F21S 48/1721; F21S 48/1715; F21S 48/1216;
(Continued)

(56) References Cited

U.S. PATENT DOCUMENTS 1,478,236 A * 12/1923 Luby .................... F21S 48/1721
362/281
3,539,799 A * 11/1970 Dangauthier ....... F21S 48/1208
362/328
(Continued)

FOREIGN PATENT DOCUMENTS

CN          201155712 Y     11/2008
DE          10353375 A1      6/2005
(Continued)

OTHER PUBLICATIONS

Ressia, Headlight lens for motor vehicles, Aug. 5, 1988, FR2610264, English.*
(Continued)

*Primary Examiner* — Bryon T Gyllstrom
*Assistant Examiner* — James M Endo
(74) *Attorney, Agent, or Firm* — Cantor Colburn LLP (57) ABSTRACT

A method of providing multiple headlamp configurations sharing a common vehicle-mount interface, including selecting one of at least two reflectors, the at least two reflectors sharing a common forward interface and the common vehicle-mount interface at a rearward interface, with each having a different reflector shape; affixing the selected reflector to a rear portion of a bezel shaped to conform to the common forward interface of the at least two reflectors; and affixing one of at least two lamp bezels to a forward interface of the bezel, wherein the at least two lamp bezels share a common rear portion shaped to conform to the common
(Continued)

forward interface of the bezel, and are shaped differently at their respective front portions.

16 Claims, 4 Drawing Sheets

(51) Int. Cl.
| | |
|---|---|
| *F21S 45/00* | (2018.01) |
| *F21S 41/00* | (2018.01) |
| *F21S 41/55* | (2018.01) |
| *B60Q 1/18* | (2006.01) |
| *B60Q 1/20* | (2006.01) |
| *B60Q 1/28* | (2006.01) |
| *F21S 43/37* | (2018.01) |
| *F21S 43/27* | (2018.01) |
| *F21S 41/39* | (2018.01) |

(52) U.S. Cl.
CPC .............. *F21S 41/00* (2018.01); *F21S 41/39* (2018.01); *F21S 41/55* (2018.01); *F21S 43/27* (2018.01); *F21S 43/37* (2018.01); *F21S 45/00* (2018.01); *B60Q 2400/30* (2013.01)

(58) Field of Classification Search
CPC .......... F21S 48/17; F21S 48/24; F21S 48/125; F21S 48/1291; F21S 48/1283; F21S 48/1275; F21S 48/1225; F21S 48/2212; F21S 48/22; F21S 48/1258; F21S 41/00; F21S 41/29; F21S 41/39; F21S 41/55; F21S 43/27; F21S 43/37; F21S 45/00; F21V 17/002; F21V 4/06; F21V 4/065; F21V 14/06; F21V 14/065; F21W 2131/406; B60Q 1/18; B60Q 1/20; B60Q 1/28; B60Q 2400/30
USPC ...................... 362/512, 509, 16, 17, 18, 277
See application file for complete search history.

(56) References Cited

U.S. PATENT DOCUMENTS

| | | | |
|---|---|---|---|
| 4,812,955 | A | 3/1989 | Beswick et al. |
| 5,603,561 | A * | 2/1997 | Ohishi ................ F21S 48/2212 362/309 |
| 6,039,466 | A | 3/2000 | Duchenne et al. |
| 6,054,072 | A | 4/2000 | Bentley et al. |
| 6,206,544 | B1 * | 3/2001 | Costa ....................... F21V 3/04 313/487 |
| 6,210,024 | B1 * | 4/2001 | Shida .................. F21S 48/1208 362/342 |
| 7,416,321 | B2 | 8/2008 | Formanek et al. |
| 2004/0027696 | A1 * | 2/2004 | Moret ................... B29C 65/568 359/853 |
| 2004/0174714 | A1 * | 9/2004 | Peitz .................. F21S 48/1258 362/539 |
| 2005/0128762 | A1 * | 6/2005 | Goraguer .......... B29C 45/14434 362/509 |
| 2006/0077681 | A1 * | 4/2006 | Ikeda .................. B29C 65/1635 362/510 |
| 2006/0232977 | A1 * | 10/2006 | Hwang ............... F21S 48/1258 362/341 |
| 2008/0037268 | A1 * | 2/2008 | Tendo .................. F21S 48/1145 362/510 |
| 2008/0079906 | A1 * | 4/2008 | Finn ........................ F21S 2/005 353/53 |
| 2008/0259628 | A1 | 10/2008 | Lin | |

FOREIGN PATENT DOCUMENTS

| | | | | |
|---|---|---|---|---|
| DE | 102007050903 A1 | 4/2009 | | |
| EP | 0950563 A1 | 10/1999 | | |
| EP | 1270320 A2 | 1/2003 | | |
| EP | 1693249 A2 | 8/2006 | | |
| FR | 2217633 A1 * | 9/1974 | .............. | F21S 48/10 |
| FR | 2610264 A1 * | 8/1988 | ........... | B60Q 1/0466 |
| GB | 1246107 A | 9/1971 | | |
| JP | 2000294012 A | 10/2000 | | |
| JP | 2004327332 A | 11/2004 | | |
| JP | 4009432 B2 | 11/2007 | | |
| JP | 2011255628 A | 12/2011 | | |
| JP | 2011258391 A | 12/2011 | | |
| WO | 8101185 A1 | 4/1981 | | |

OTHER PUBLICATIONS

Ducellier, No title, Sep. 6, 1974, FR2217633, English.*
European Publication No. 1270320; Publication Date: Jan. 2, 2003; Abstract Only, 1 page.
European Publication No. 1693249; Publication Date: Aug. 23, 2006; Abstract Only, 2 pages.
German Patent No. 102007050903; Publication Date: Apr. 30, 2009; Abstract Only, 1 page.
German Patent No. 10353375; Publication Date: Jun. 16, 2005; Abstract Only, 1 page.
International Search Report for International Application No. PCT/IB2015/051917; dated Jul. 3, 2015; 5 pages.
Japanese Patent No. 2000294012; Publication Date: Oct. 20, 2000; Abstract Only, 2 pages.
Japanese Patent No. 2004327332; Publication Date: Nov. 18, 2004; Abstract Only, 2 pages.
Japanese Patent No. 2011255628; Publication Date: Dec. 22, 2011; Abstract Only, 2 pages.
Japanese Patent No. 2011258391; Publication Date: Dec. 22, 2011; Abstract Only, 2 pages.
Japanese Patent No. 4009432; Publication Date: Nov. 14, 2007; Abstract Only, 2 pages.
Written Opinion of the International Search Report for International Application No. PCT/IB2015/051917; dated Jul. 3, 2015; 10 pages.
Chinese Patent No. 201155712; Publication Date: Nov. 26, 2008; Abstract Only, 1 page.

* cited by examiner

Fig. 2

MODULAR LAMP COMPONENTS AND METHODS FOR MAKING SAME

CROSS REFERENCE TO RELATED APPLICATIONS

This application is a 371 of International Application No. PCT/IB2015/051917, filed Mar. 16, 2015, which claims priority to U.S. Application No. 61/955,271, filed Mar. 19, 2014 both which are incorporated herein by reference in their entirety.

BACKGROUND

Components for vehicle lamps can include a wide variety of designs. For example, numerous designs are possible for a lens, bezel, reflector, housing, and/or light source. However, certain methods for manufacturing vehicle lamps can preclude the possibility of using certain combinations of components. For example, a component that may be suitable for coupling with an adhesive may not be suitable for laser welding.

Vehicle lamp components can vary between different makes and models of vehicles and can also vary between different models of the same vehicle. For example, a component for use in a first vehicle model may not be compatible for use in a different vehicle model. In addition, a component for a model year of a certain vehicle may not be compatible for use in a different model year of the same vehicle. Thus, each model and/or model year can require a specific individual design of reflector, housing, bezel, and/or lens, which can increase both manufacturing costs and efficiency.

In addition, different functions, such as day time running lights, fog lights, auxiliary lights, and cornering lights can require individual lamp design for each platform or function. As such, a component, such as a reflector used for a function such as a fog light, may not be used for another function, such as a day time running light. Thus, each function requires specialized components, which can add expense and time to the manufacturing process.

Accordingly, manufacturing and development of individual components for each vehicle model, function, and model year is inefficient and costly. Thus, a need exists for the development and manufacture of components that are interchangeable, e.g., can be used for more than one function, model, year, etc.

BRIEF DESCRIPTION

Disclosed herein are vehicle lamp components, articles including lamp components, and methods of making and using the same.

A lamp for a vehicle, comprising: a reflector including a connection portion and a light source portion, wherein a light source is configured to extend through the light source portion into the reflector; a bezel comprising an adaptor portion including an adaptor portion geometry and a reflector receiver including a geometry shaped to conform to receive and conform to the reflector; and a lens comprising a junction portion including a lens junction portion geometry; and an adaptor bezel located between the lens junction portion and the adaptor portion of the bezel, wherein the adaptor bezel has a lens adaption portion with an adaptor bezel geometry configured to mate with the lens junction portion, and a bezel adaption portion geometry configured to mate with the adaptor portion.

A method of making a lamp for a vehicle, comprising: attaching a bezel to a reflector including a connection portion and a light source portion, wherein a light source is configured to extend through the light source portion into the reflector when attached to the reflector, wherein the bezel comprises an adaptor portion including an adaptor portion geometry and a reflector receiving portion including a geometry configured to receive the reflector; and attaching a lens comprising a junction portion including a lens junction portion geometry to the bezel, wherein if the lens junction portion geometry are mateable with the adaptor portion geometry, then the lens junction portion is attached to the adaptor portion; or wherein if the lens junction portion geometry are not mateable with the adaptor portion geometry, then an adaptor bezel is located between the lens junction portion and the adaptor portion, and wherein the adaptor bezel has a lens adaption portion with a geometry to mate with the lens junction portion, and has a bezel adaption portion geometry to mate with the adaptor portion.

A method of providing multiple headlamp configurations sharing a common vehicle-mount interface, the method comprising: selecting one of at least two reflectors, the at least two reflectors sharing a common forward interface and the common vehicle-mount interface at a rearward interface, with each having a different reflector shape; affixing the selected reflector to a rear portion of a bezel shaped to conform to the common forward interface of the at least two reflectors; and affixing one of at least two lamp bezels to a forward interface of the bezel, wherein the at least two lamp bezels share a common rear portion shaped to conform to the common forward interface of the bezel, and are shaped differently at their respective front portions.

Also included herein are vehicles comprising the components.

The above described and other features are exemplified by the following figures and detailed description.

BRIEF DESCRIPTION OF THE DRAWINGS

Refer now to the figures, which are exemplary embodiments, and wherein like elements are numbered alike.

DETAILED DESCRIPTION

In the current marketplace, each vehicle make and/or model can have an individualized vehicle lamp design for different lamps on the vehicle including day time running lights, fog lights, auxiliary lights, cornering lights, etc. For example, the reflector, housing, and/or lens design can vary between vehicle makes and can vary between different model years of the same vehicle. Disclosed herein, in various embodiments, are vehicle lamp components that can be interchanged between various vehicle makes and models. The vehicle lamp components can include a uniform reflector having the ability to be combined with multiple designs of other vehicle lamp components such as bezels, lenses, and a variety of light sources. Such a combination of lens, bezel, and reflector can allow the use of many designs with a minimum number of reflectors. The reflectors can be interchanged between various vehicle makes and models, whereas the bezels and lenses can be individually designed. Since reflector development and tooling can be the most expensive portion of vehicle lamp design, the ability to use the same reflector between different vehicle platforms while simultaneously providing the flexibility to change the design of the bezel and/or lens can decrease the overall cost of a vehicle lamp and can allow a greater flexibility in different designs.

The vehicle lamps disclosed herein can include a lens, a bezel, a reflector, and a light source. The light source can include any light source that will provide the desired lighting effect to the vehicle lamp. For example, the light source can include a filament light source such as a halogen light source, an arc-lamp light source such as a high-intensity discharge (HID) light source, a light emitting diode (LED) light source, neon, and other light sources such as laser light. The light source can include a single light, e.g., a single halogen light, or can include multiple lights, e.g., a grouping of LEDs. If an LED light source is used, heat sinks can be included to assist in dissipating heat generated by the LED light source. The light source can additionally include a power input that can be compatible with a power supply from the vehicle to which the light source is attached. Additionally, the vehicle lamps can include moveable portions or can be attached to moveable portions of the vehicle.

The reflector can include a connection portion and a light source portion with the light source extending through the light source portion into the reflector. The reflector can additionally include a shoulder portion and a base portion connected by a lip, where the shoulder portion can be configured to mate with or engage an inner surface of the bezel. The reflector can further include attachment components to assist in attaching the lamp assembly to the vehicle.

The bezel can include an adaptor portion having an adaptor portion geometry (e.g., size, shape, position, etc.) and a reflector receiving portion having a reflector receiving portion geometry configured to receive the reflector. The lens can include a junction portion having a lens junction portion geometry, while an optional adaptor bezel can be located between the lens junction portion and the connector portion. In some embodiments, the junction portion cannot be mated with the adaptor portion. The adaptor bezel can be used in this case or when different shaped lenses are desired, but the reflector can remain uniform between different lamps (e.g., a daytime running light and a corner light). The adaptor bezel can include a lens adaption portion with an adaptor geometry configured to mate with the lens junction portion and can also have a bezel adaption portion geometry configured to mate with the adaptor portion of the bezel. The junction portion can have a different geometry than the adaptor portion.

The cross-sectional shape of the lens at the connection portion can be configured to engage a cross-section of the bezel at the adaptor portion, e.g., the cross-section of the lens at the connection portion can be substantially identical to the adaptor portion of the bezel. Alternatively, the cross-section of the lens at the connection portion can be smaller than the cross-section of the adaptor portion or the cross-section of the lens at the connection portion can be larger than the cross-section of the lens receiving portion, so as to surround a portion of the adaptor portion.

It can be desirable for the lens, bezel, adaptor bezel, and reflector to have certain optical properties when laser welding the parts. For example, since two transparent parts cannot be welded together, the lens and/or reflector can be transparent, while the bezel and/or adaptor bezel can be semi-transparent or opaque (e.g., IR absorbing to allow for laser welding technology). Laser welding can offer many advantages including a shorter cycle time as compared to molding the components and then attaching the components together in an additional step and no dust generation. The reflector can also be partially metallized at photometric surfaces, but IR transparent at a joining surface which is to be laser welded. For example, the color black is transparent for laser light shining through (e.g., black allows laser light to shine through), so the surface to be welded can be black. With regards to the transparency of the lens and/or reflector and/or bezel and/or adaptor bezel, it is briefly noted that end user specifications can specify that the lens and/or reflector and/or bezel and/or adaptor bezel satisfy a particular predetermined threshold. For example, various components of the lamp including the lens and/or reflector and/or bezel and/or adaptor bezel can have a transparency allowing laser light to shine through, e.g., can be IR absorbing at a frequency of 800 to 1,000 nanometers (nm). The frequency can be 900 nm. The frequency can be 935 nm. The frequency can be 950 nm.

The lens and/or reflector and/or bezel and/or adaptor bezel can include any thermoplastic material or combination of thermoplastic materials that can be formed into the desired shape and provide the desired properties. Exemplary materials include thermoplastic materials as well as combinations of thermoplastic materials with elastomeric materials, and/or thermoset materials. Possible thermoplastic materials include polybutylene terephthalate (PBT); polyethylene terephthalate (PET); polyethersulfone (PES); acrylonitrile-butadiene-styrene (ABS); polycarbonate (PC) (LEXAN™, LEXAN™ EXL, and LEXAN™ XHT resins, commercially available from SABIC's Innovative Plastics business); polycarbonate (PC)/PBT or PC/PET blends (XENOY™ resins, commercially available from SABIC's Innovative Plastics business); PC/ABS blends (CYCOLOY™ resins, commercially available from SABIC's Innovative Plastics business); copolycarbonate-polyesters; acrylic-styrene-acrylonitrile (ASA); acrylonitrile-(ethylene-polypropylene diamine modified)-styrene (AES); polyphenylene ether (PPE); PPE/polystyrene (PS) blends (NORYL™ resins, commercially available from SABIC's Innovative Plastics business); PPE/polyamide blends (NORYL GTX™ resins, commercially available from SABIC's Innovative Plastics business); polyamides; phenylene sulfide; polyvinyl chloride (PVC); low/high density polyethylene (L/HDPE); polypropylene (PP); expanded polypropylene (EPP); polyethylene and fiber composites; long fiber reinforced thermoplastics (VERTON™ resins, commercially available from SABIC's Innovative Plastics business), polyetherimide (ULTEM™ resins, commercially available from SABIC's Innovative Plastics business) and thermoplastic olefins (TPO), as well as combinations comprising at least one of the foregoing.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
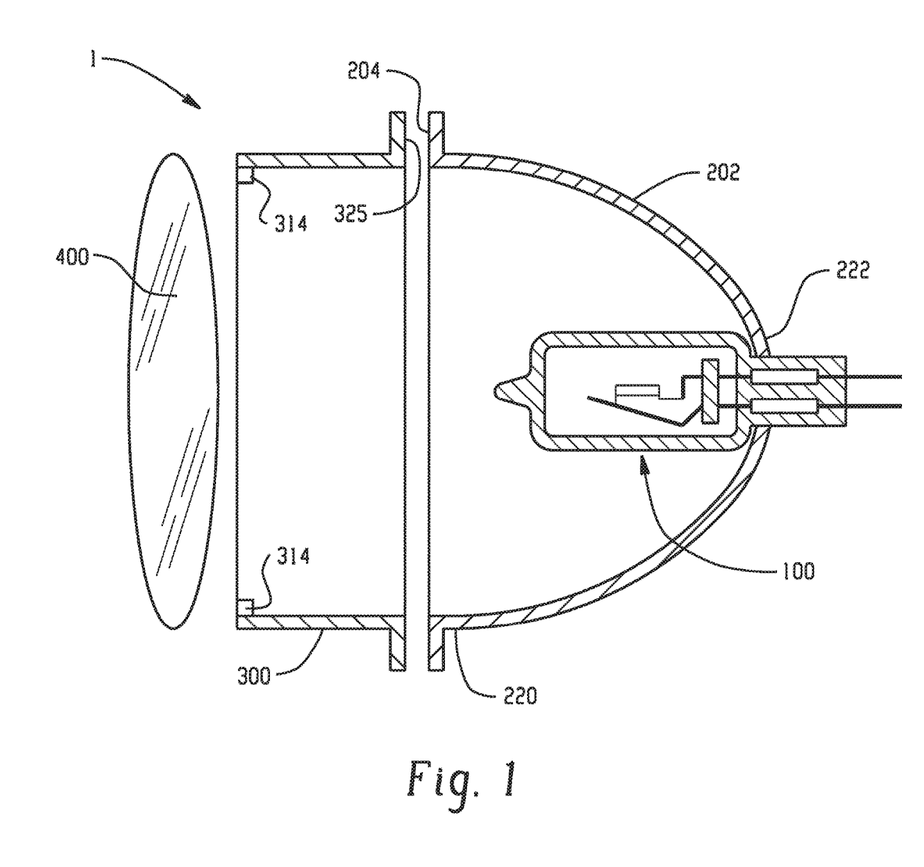
FIG. 1 is a cross-sectional view of an exemplary vehicle lamp comprising a light source, reflector, bezel, and lens.
Figure 2:
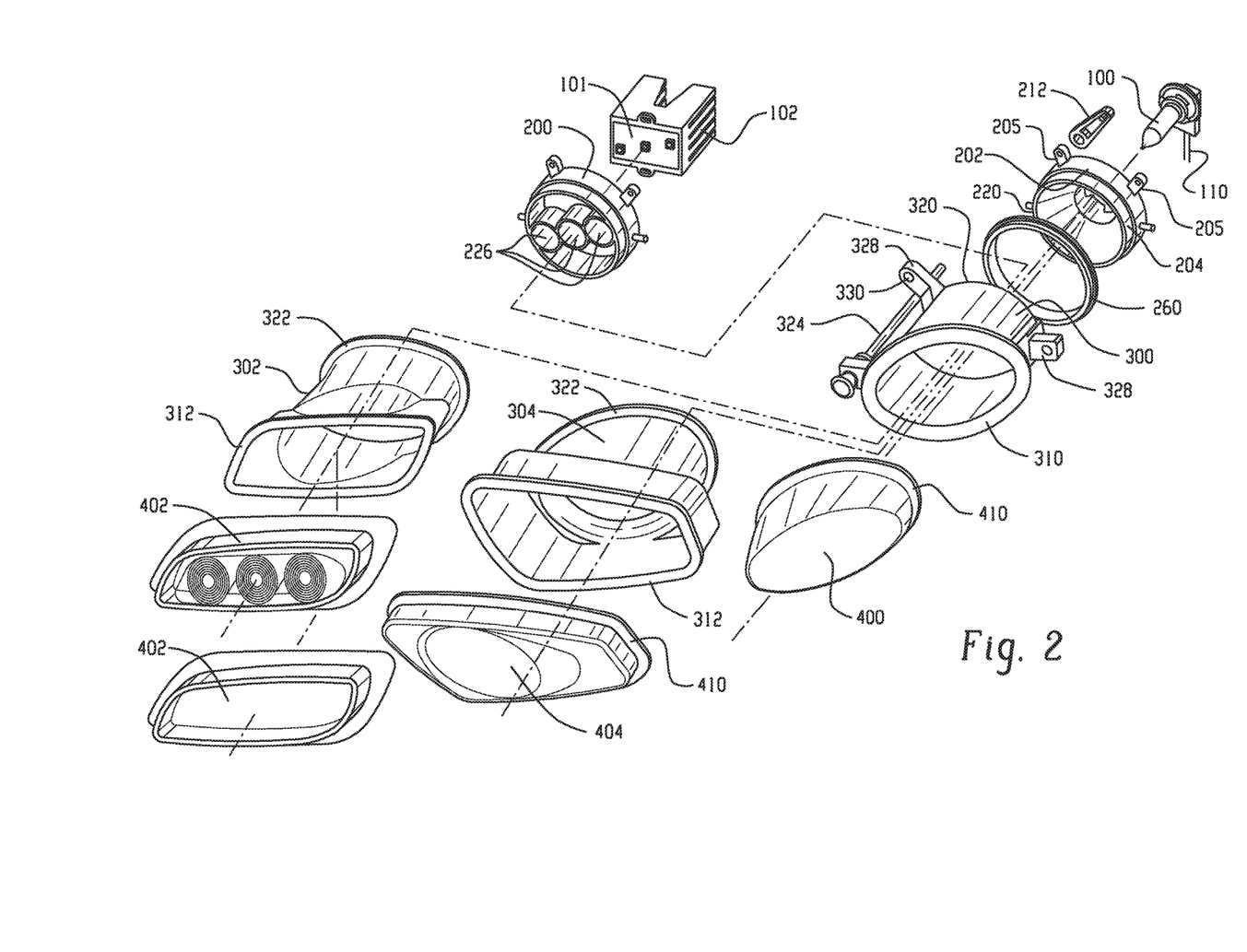
FIG. 2 is an exploded, disassembled, prospective view of embodiments of vehicle lamps comprising a plurality of light sources, reflectors, bezels, and lenses.

Turning now to FIGS. 1 to 4, cross sectional views of a lamp and its components are illustrated. As shown in FIG. 1, lamp 1 can include a lens 400, a bezel 300, a reflector 200, and a light source 100. FIG. 2 illustrated an exploded view of exemplary lamp configurations. As shown in FIG. 2, a plurality of lens 400, 402, 404, bezel 300, and adaptor bezel 302, 304 combinations can be compatible with a single, uniform reflector 200. For example, a single reflector can be compatible with a bezel and lens combination designed for a fog light, daytime running light (DRL), cornering light, or positioning light. With a uniform reflector, tooling and processing steps can be reduced for the manufacture of multiple reflectors for each type of light within the same vehicle. Additionally, the single reflector can be used in other vehicles employing the interchangeable component system described herein.

The light source 100, 101 can include a halogen light source, a HID light source, an LED light source, or a laser light unit. When a LED light source is utilized, as illustrated in FIG. 2, more than one light can be used and heat sinks 102 can also be present. The heat sinks 102 can dissipate heat away from the LED light source to enable it to function properly. As seen in FIG. 2, a power input 110 can be present where the power input 100 can be compatible with a power supply from a vehicle to which it is attached.

Figures 3, 4:
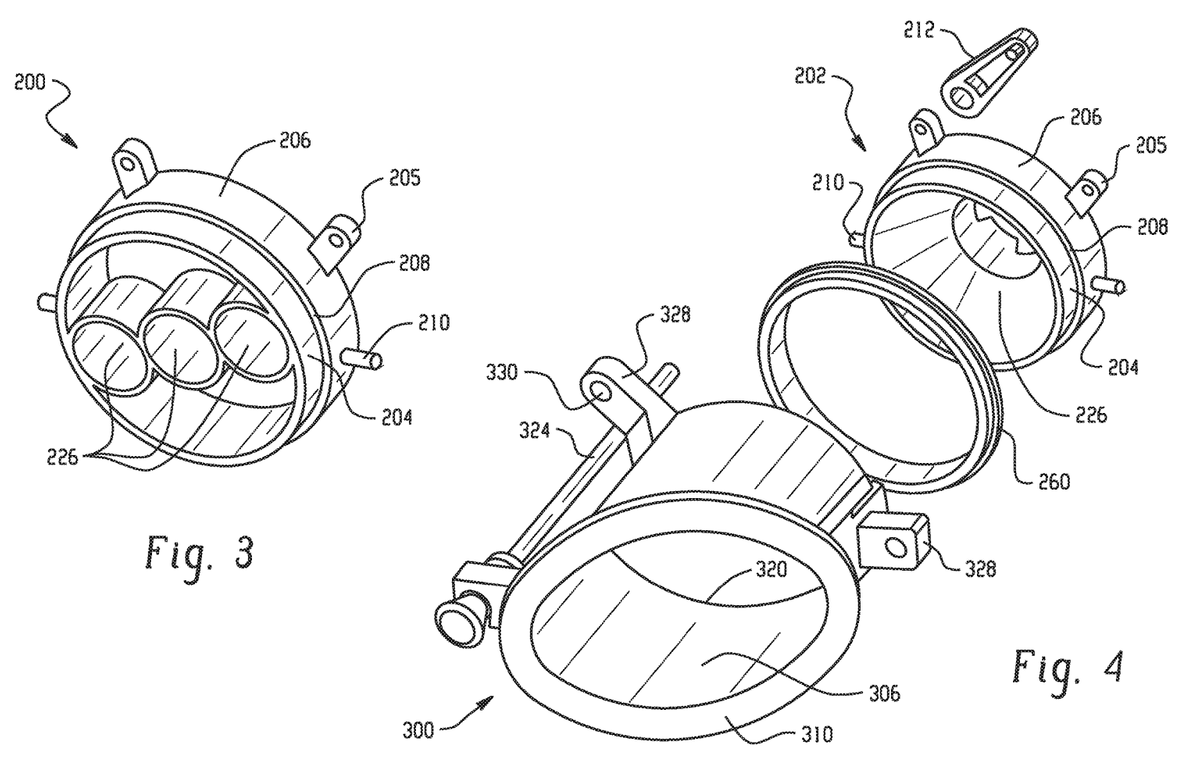
FIG. 3 is a detailed view of a reflector of FIG. 2.
FIG. 4 is a detailed view of a reflector and bezel assembly of FIG. 2.

The reflector 200, 202 can include a combination of a reflector and housing integrated as a single unit as illustrated in FIGS. 1 and 2. With a combination of reflector and housing as an integrated unit, the need for two separate components can be eliminated, which can also reduce manufacturing costs. As illustrated in the figures, the reflector 200, 202 can have a concave shape with light reflectors 226 configured to accommodate the light source 100, 101. As illustrated in FIG. 2, multiple light reflectors (e.g., LED light reflectors 226) can be present to accommodate multiple lights when present, e.g., light source 101. FIGS. 3 and 4 illustrate the reflector 200, 202 in greater detail. As can be seen in FIG. 3, reflector 200, 202 can comprise a shoulder portion 204 connected to a base portion 206 via lip 208 where the shoulder portion 204 has a smaller diameter than the base portion 206. The shoulder portion 204 can be configured to receive a portion of the bezel 300 during assembly of the lamp 100. Attachment component 205 can project from base portion 206 and can enable attachment of the lamp 1 to a vehicle. For example, attachment component 205 can comprise a tab with an opening to accommodate a screw, pin, bolt, clip, or other removable attachment mechanism. Lever 212 can be present to adjust the position of the reflector 200, 202 vertically (e.g., if the reflector 200, 202 is mounted incorrectly (too high or too low), lever 212 can adjust the position of the reflector 200, 202).

The reflector 200, 202 can further include a connection portion 220 (e.g., forward interface) on the shoulder portion 204 where the connection portion 220 faces the bezel 300. The shoulder portion 204 can be configured to receive an inner surface 306 of the bezel 300. On an end of the reflector 200, 202 opposite the connection portion 220 can be a light source portion 222 (e.g., rearward interface), where the light source 100, 101 can extend through the light source portion 222 into the reflector. The reflector 200, 202 can comprise any desired shape, including, but not limited to circular, elliptical, square, rectangular, trapezoidal, parallelogram, triangular, rhomboid, octagon, oval, semicircular, etc.

As illustrated in FIG. 1, the cross-section of the reflector 200 at the connection portion 220 can be dimensioned to correspond to the cross-section of the bezel 300 at the bezel reflector receiving portion 320 such that the bezel connection surface 325 and shoulder portion 204 of the reflector 200 are substantially aligned and/or identical in cross-sectional shape. For example, bezel 300 and reflector 200 can be joined together at the respective connection surfaces 325, 204 through a variety of possible attachment mechanisms including adhesion, laser welding, clamping, vibration welding, hot plate welding, etc. For example, clamp 260 can be present between the reflector 200, 202 and the bezel 300 to provide a water resistant connection (e.g. clamp 260 can seal the reflector 200, 202 to the bezel 300).

As can be seen in FIGS. 2 and 4, the bezel 300 can include an adaptor portion 310 (e.g., forward interface) with an adaptor portion geometry and can also include a reflector receiving portion 320 (e.g., rearward interface) with a reflector portion geometry configured to receive the reflector 200, 202. The adaptor portion 310 can be configured to receive an adaptor bezel 302, 304 (e.g., lamp bezel) where the adaptor portion 310 can have a larger cross-sectional shape, e.g., a larger diameter, than the reflector receiving portion 320. The adaptor portion 310 can also be configured to receive a lens 400 wherein the bezel 300 and the lens 400 can be connected at a junction portion 410 of the lens and the adaptor portion 310 of the bezel 300. As previously described, the shoulder portion 204 of the reflector 200, 202 can be configured to engage the bezel inner surface 306 when the bezel 300 and the reflector 200, 202 are attached. Pin 324 can be present as part of an adjustment system for adjusting the lamp 1 due to tolerance differences on a front end of a vehicle. Pin 324 can be present on either or both sides of reflector 300. Nose 326 and extension 210 can assist in holding the lamp 1 in place in the vehicle. The lamp 1 can be further attached to the vehicle with a bolt inserted into an opening 330 in projection 328.

Adaptor bezel 302, 304 can include the bezel adaption portion 322 (e.g., rear portion) for connection to the adaptor portion 310 of the bezel 300 and can also include, on an end opposite the bezel adaption portion 322, a lens adaption portion 312 (e.g., front portion) for connection with various lenses 402, 404. As with the reflector, bezel 300 and adaptor bezel 302, 304 can comprise any desired shape, including, but not limited to circular, elliptical, square, rectangular, trapezoidal, parallelogram, triangular, rhomboid, octagonal, oval, semicircular, etc. with the understanding that the adaptor bezel 302, 304 can have the same or a different shape on the lens adaption portion 312 than on the bezel adaption portion 322. The bezel adaption portion 322 can be configured to have a corresponding shape to the adaptor portion 310 of the bezel 300 in order to facilitate attachment between the bezel 300 and the adaptor bezel 302, 304. In such an embodiment, the reflector design can be uniform across different vehicle makes and models and the bezel and lens components can be varied or interchangeable between different vehicle makes and models. Adaptor bezel 302, 304 can be attached to the bezel 300 via a variety of attachment mechanisms including adhesion (e.g., a pressure sensitive adhesive), a clamping mechanism, and/or welding (e.g., ultrasonic or laser welding).

Figure 5:
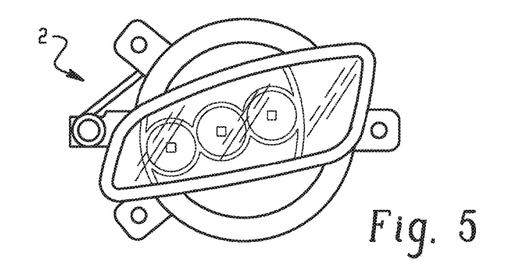
FIG. 5 is an assembled view of a vehicle lamp comprising a reflector, bezel, lens, light source, and/or adaptor bezel.
Figure 6:
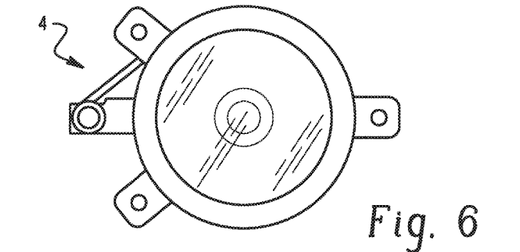
FIG. 6 is an assembled view of a vehicle lamp comprising a reflector, bezel, lens, light source, and/or adaptor bezel.
Figure 7:
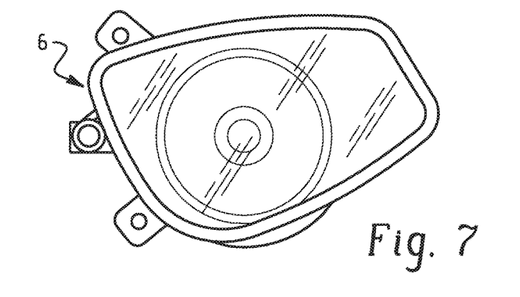
FIG. 7 is an assembled view of a vehicle lamp comprising a reflector, bezel, lens, light source, and/or adaptor bezel.
Figure 8:
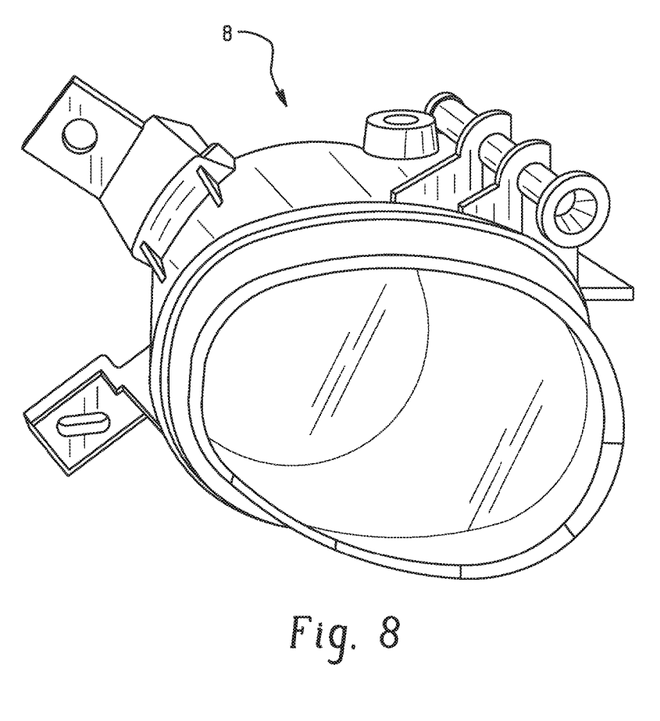
FIG. 8 is an assembled view of a vehicle lamp comprising a reflector, bezel, lens, light source, and/or adaptor bezel.

FIGS. 5 through 8 illustrate various examples of assembled lamps comprising a reflector, bezel, lens, and light source. For example, as illustrated in FIG. 5, a lamp 2 is illustrated including an LED light source whereas FIGS. 6 to 8 include a lamp 4, 6, 8 with a halogen, HID light source, LED light source, or a laser light source. As can be seen in FIGS. 5 through 8, the reflector remains consistent between the different designs, with the bezel, lens, and light source components varying between the designs. The lamps disclosed herein can provide design flexibility by keeping the reflector consistent between different designs and varying the bezel, lens, and/or light source and can also reduce cost since the reflector can be the most expensive portion of the lamp.

As previously described herein, the various components of the vehicle lamp can be laser welded. For example, reflector 200 can be laser welded to bezel 300. In addition, bezel 300 can be laser welded to lens 400. When adaptor bezel 302, 304 is present, the adaptor bezel 302, 304 can be laser welded to the bezel 300 and the lens 402, 404 can be laser welded to the adaptor bezel 302, 304. Laser welding allows for an efficient process with low equipment cost and flexibility in contours and low cycle time. Laser welding includes the joining together two components with different light absorption properties. For example, one of the components can be transparent to the wavelength of the laser beam, whereas the other component can absorb the energy of the laser beam. During the laser welding process, the laser beam can pass through a first (i.e., transparent) component and when the laser beam hits the surface of the second (i.e., absorbent) component, the light from the laser beam is absorbed and converted into heat. This heat is then passed into the transparent component by thermal conduction, causing the material of both components to melt, and weld together. The laser can operate in the infrared range (IR) of the electromagnetic spectrum (e.g., wavelengths of 700 to 1200 nanometers (nm)), which is referred to as IR laser welding. As disclosed herein, the lens and reflector can be made of IR transparent materials, while the bezel can be made of an IR absorbent material.

A method of making the vehicle lamp disclosed herein can include attaching a light source to a reflector where the reflector has a connection portion and a light source portion and wherein, after attachment, the light source extends through the light source portion into the reflector. The bezel can then be attached to the reflector where the bezel includes an adaptor portion having an adaptor portion size and a geometry and a reflector receiving portion having a geometry configured to receive the reflector. A lens can be attached to the bezel, where the lens includes a junction portion having a lens junction portion geometry. If the lens junction portion geometry is mateable with the adaptor portion geometry, then the lens junction portion can be attached to the adaptor. If the lens junction portion geometry is not mateable with the adaptor portion geometry, then an adaptor bezel can be located between the lens junction portion and the adaptor portion. The adaptor bezel can have a lens adaption portion with a geometry configured to mate with the lens junction portion and can also have a bezel adaption portion geometry configured to mate with the adaptor portion. Attachment can include adhesives, snap fitting mechanisms, screw and bolts, welding (e.g., laser welding or ultrasonic welding), etc. The components can be laser welded to one another providing a process with a lower cycle time and lower equipment cost as compared to lamp assemblies where the reflector is different between each different lamp on a vehicle.

A method of providing multiple headlamp configurations sharing a common vehicle-mount interface, the method comprising: selecting one of at least two reflectors, the at least two reflectors sharing a common forward interface (i.e., connection portion) and the common vehicle-mount interface at a rearward interface (i.e., light source portion), with each having a different reflector shape; affixing the selected reflector to a rear portion (i.e., reflector receiving portion) of a bezel shaped to conform to the common forward interface (i.e., connection portion) of the at least two reflectors; and affixing one of at least two lamp bezels (i.e., adaptor bezels) to a forward interface (i.e., adaptor portion) of the bezel, wherein the at least two lamp bezels share a common rear portion (i.e., bezel adaption portion) shaped to conform to the common forward interface of the bezel, and are shaped differently at their respective front portions (i.e., lens adaption portions).

The lamps and methods of making thereof include at least the following embodiments:

Embodiment 1

A lamp for a vehicle, comprising: a reflector including a connection portion and a light source portion, wherein a light source is configured to extend through the light source portion into the reflector; a bezel comprising an adaptor portion including an adaptor portion geometry and a reflector receiver including a geometry shaped to conform to receive and conform to the reflector; and a lens comprising a junction portion including a lens junction portion geometry; and an adaptor bezel located between the lens junction portion and the adaptor portion of the bezel, wherein the adaptor bezel has a lens adaption portion with an adaptor bezel geometry configured to mate with the lens junction portion, and a bezel adaption portion geometry configured to mate with the adaptor portion.

Embodiment 2

The lamp of Embodiment 1, wherein the junction portion is not mateable with the adaptor portion.

Embodiment 3

The lamp of Embodiment 1 or Embodiment 2, wherein the junction portion has a different geometry than the adaptor portion.

Embodiment 4

The lamp of any of Embodiments 1-3, wherein the reflector extends into the bezel at the reflector receiving portion.

Embodiment 5

The lamp of any of Embodiments 1-4, wherein the lens and/or reflector comprises an infrared transparent material.

Embodiment 6

The lamp of any of Embodiments 1-5, wherein the bezel comprises an infrared absorbing material.

Embodiment 7

The lamp of any of Embodiments 1-6, wherein the bezel is laser welded to the lens.

Embodiment 8

The lamp of any of Embodiments 1-7, wherein the bezel is laser welded to the reflector.

Embodiment 9

The lamp of any of Embodiments 1-8, wherein the reflector receiving portion comprises a cross sectional shape that is substantially identical to the first cross sectional shape of the reflector.

Embodiment 10

The lamp of any of Embodiments 1-9, wherein the connection portion of the lens comprises a cross sectional shape that is substantially identical to the adaptor portion of the bezel.

Embodiment 11

The lamp of any of Embodiments 1-10, wherein the bezel comprises polycarbonate, polyetherimide, polyethersulfone, polybutylene terephthalate, and combinations comprising at least one of the foregoing.

Embodiment 12

The lamp of any of Embodiments 1-11, further comprising at least two lenses wherein each lens has a different geometry.

Embodiment 13

A method of making a lamp for a vehicle, comprising: attaching a bezel to a reflector including a connection portion and a light source portion, wherein a light source is configured to extend through the light source portion into the reflector when attached to the reflector, wherein the bezel comprises an adaptor portion including an adaptor portion geometry and a reflector receiving portion including a geometry configured to receive the reflector; and attaching a lens comprising a junction portion including a lens junction portion geometry to the bezel, wherein if the lens junction portion geometry are mateable with the adaptor portion geometry, then the lens junction portion is attached to the adaptor portion; or wherein if the lens junction portion geometry are not mateable with the adaptor portion geometry, then an adaptor bezel is located between the lens junction portion and the adaptor portion, and wherein the adaptor bezel has a lens adaption portion with a geometry to mate with the lens junction portion, and has a bezel adaption portion geometry to mate with the adaptor portion.

Embodiment 14

The method of Embodiment 13, wherein, the reflector receiving portion of the bezel has a cross-section substantially identical to the cross section of the reflector at the connection portion.

Embodiment 15

The method of Embodiment 13 or Embodiment 14, further comprising laser welding the bezel to the reflector or laser welding the lens to the bezel.

Embodiment 16

The method of any of Embodiments 13-15, wherein the bezel comprises an IR absorbent material and wherein the lens and/or the reflector comprises an IR transparent material.

Embodiment 17

A vehicle comprising the lamp of any of Embodiments 1-16.

Embodiment 18

A method of providing multiple headlamp configurations sharing a common vehicle-mount interface, the method comprising: selecting one of at least two reflectors, the at least two reflectors sharing a common forward interface and the common vehicle-mount interface at a rearward interface, with each having a different reflector shape; affixing the selected reflector to a rear portion of a bezel shaped to conform to the common forward interface of the at least two reflectors; and affixing one of at least two lamp bezels to a forward interface of the bezel, wherein the at least two lamp bezels share a common rear portion shaped to conform to the common forward interface of the bezel, and are shaped differently at their respective front portions.

Embodiment 19

The method of Embodiment 18, comprising affixing one of two lenses to the selected lamp bezel, wherein the other of the two lenses is shaped differently than the selected lens and is incompatible with mounting to the forward interface of the selected lamp bezel.

Embodiment 20

The method of Embodiment 18 or Embodiment 19, wherein each reflector is configured to receive differently shaped light sources.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Geometry" as described herein includes size, shape, and/or position of whatever is being described. "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

I claim:

1. A lamp for a vehicle, comprising:
   a reflector including a connection portion and a light source portion, wherein a light source is configured to extend through the light source portion into the reflector;
   a bezel comprising an adaptor portion including an adaptor portion geometry and a reflector receiving portion including a geometry shaped to conform to receive and conform to the reflector; and
   at least two lenses each comprising a junction portion including a lens junction portion geometry, wherein the junction portion of each lens has a different lens junction portion geometry; and
   at least two adapter bezels, wherein each adaptor bezel comprises a lens adaption portion and a bezel adaption portion geometry, wherein the lens adaption portion of each adaptor bezel has a different adaptor bezel geometry, and wherein the bezel adaption portion geometry of one of the at least two adaptor bezels mates with the adaptor portion of the bezel;
   wherein the adaptor bezel geometry of a first adaptor bezel of the at least two adaptor bezels mates with the junction portion of a first lens of the at least two lenses, and wherein the adaptor bezel geometry of a second adaptor bezel of the at least two adaptor bezels mates with the junction portion of a second lens of the at least two lenses; and
   wherein the junction portion of the first lens of the at least two lenses is shaped differently than the junction portion of the second lens of the at least two lenses such that the first lens is incompatible with the second adaptor bezel and the second lens is incompatible with the first adaptor bezel.

2. The lamp of claim 1, wherein the reflector extends into the bezel at the reflector receiving portion.

3. The lamp of claim 1, wherein the lens and/or reflector comprises an infrared transparent material.

4. The lamp of claim 1, wherein the bezel comprises an infrared absorbing material.

5. The lamp of claim 1, wherein the bezel is laser welded to the lens.

6. The lamp of claim 1, wherein the bezel is laser welded to the reflector.

7. The lamp of claim 1, wherein the reflector receiving portion comprises a cross sectional shape that is substantially identical to the first cross sectional shape of the reflector.

8. The lamp of claim 1, wherein a cross-section of the lens comprises a cross sectional shape that is substantially identical to the adaptor portion of the bezel.

9. The lamp of claim 1, wherein the bezel comprises polycarbonate, polyetherimide, polyethersulfone, polybutylene terephthalate, or a combination comprising at least one of the foregoing.

10. A method of making a lamp for a vehicle, comprising:
    attaching a bezel to a reflector including a connection portion and a light source portion, wherein a light source is configured to extend through the light source portion into the reflector when attached to the reflector, wherein the bezel comprises an adaptor portion including an adaptor portion geometry and a reflector receiving portion including a geometry configured to receive the reflector; and
    attaching one of at least two lenses, each lens comprising a junction portion including a different lens junction portion geometry, to the bezel,
    wherein if the lens junction portion geometry are mateable with the adaptor portion geometry, then the lens junction portion is attached to the adaptor portion; or
    wherein if the lens junction portion geometry are not mateable with the adaptor portion geometry, then one of at least two adaptor bezels is located between the lens junction portion and the adaptor portion, and wherein each adaptor bezel has a lens adaption portion with a different geometry to mate with the lens junction portion, and has a bezel adaption portion geometry to mate with the adaptor portion;
    wherein the adaptor bezel geometry of a first adaptor bezel of the at least two adaptor bezels mates with the junction portion of a first lens of the at least two lenses, and wherein the adaptor bezel geometry of a second adaptor bezel of the at least two adaptor bezels mates with the junction portion of a second lens of the at least two lenses; and
    wherein the junction portion of the first lens of the at least two lenses is shaped differently than the junction portion of the second lens of the at least two lenses such that the first lens is incompatible with the second adaptor bezel and the second lens is incompatible with the first adaptor bezel.

11. The method of claim 10, wherein, the reflector receiving portion of the bezel has a cross-section substantially identical to the cross section of the reflector at the connection portion.

12. The method of claim 10, further comprising laser welding the bezel to the reflector or laser welding the lens to the bezel.

13. The method of claim 10, wherein the bezel comprises an IR absorbent material and wherein the lens and/or the reflector comprises an IR transparent material.

14. A vehicle comprising the lamp of claim 1.

15. A method of providing multiple headlamp configurations sharing a common vehicle-mount interface, the method comprising:
    selecting one of at least two reflectors, the at least two reflectors sharing a common forward interface and the common vehicle-mount interface at a rearward interface, with each having a different reflector shape;

affixing the selected reflector to a rear portion of a bezel shaped to conform to the common forward interface of the at least two reflectors; and affixing one of at least two lamp bezels to a forward interface of the bezel, wherein the at least two lamp bezels share a common rear portion shaped to conform to the common forward interface of the bezel, and are shaped differently at their respective front portions;

affixing one of two lenses to a front portion of the selected lamp bezel, wherein the other of the two lenses is shaped differently than the selected lens such that the other of the two lenses is incompatible with mounting to the front portion of the selected lamp bezel.

16. The method of claim 15, wherein each reflector is configured to receive differently shaped light sources.

\* \* \* \* \*